United States Patent [19]

Blackwell

[11] 3,735,375
[45] May 22, 1973

[54] CIRCUIT FOR DETECTION OF SMALL RESISTANCE CHANGES IN IONIZATION CHAMBER DEVICES

[75] Inventor: Lyman L. Blackwell, Denver, Colo.

[73] Assignee: Central Investment Corporation, Denver, Colo.

[22] Filed: Dec. 4, 1969

[21] Appl. No.: 876,156

Related U.S. Application Data

[63] Continuation of Ser. No. 546,663, May 2, 1966, abandoned.

[52] U.S. Cl. ..........................340/237 S, 250/83.6 FT
[51] Int. Cl. ........................G08b 17/10, H01j 39/28
[58] Field of Search ....................340/237 S; 250/83.6

[56] References Cited

UNITED STATES PATENTS 2,278,920  4/1942  Evans et al.....................340/237 UX
2,408,051  9/1946  Donelian............................340/237

Primary Examiner—John W. Caldwell
Assistant Examiner—Daniel Myer
Attorney—Anderson, Spangler & Wymore

[57] ABSTRACT

Electronic circuit for detecting small resistance changes in conductors of high resistance wherein the conductor is connected between grid and cathode of a tube connected as a triode and the grid bias is adjusted almost to the point necessary for tube current cut-off, such that some significant amount of grid current flows at all times. The high resistance conductor may be a sensing element such as an ion chamber. The level of grid current serves to identify an alarm, no-alarm or an outage condition with such a sensing device.

3 Claims, 6 Drawing Figures

PATENTED MAY 22 1973  3,735,375

INVENTOR
LYMAN L. BLACKWELL
BY
Anderson, Spangler & Wymore
ATTORNEYS 3,735,375

CIRCUIT FOR DETECTION OF SMALL RESISTANCE CHANGES IN IONIZATION CHAMBER DEVICES

The present application is a continuation of applicant's prior application Ser. No. 546,663 filed May 2, 1966, and now abandoned.

Fundamental to the objects of the present invention is the provision of a detecting circuit which will operate a hard contact switch means from very small current changes which are produced by the changing resistance in a sensing device, test probe, or speciman under observation.

Also important to the objects of the invention is the provision of novel feedback loops, both negative and positive, for stabilizing the quiescent operation of the circuit and for insuring the integrity and reliability of the step function output of the device.

Another object of the invention is to provide a circuit of the type described which can be easily adapted to serve as a fire detector or, more generally speaking, a sensitive aerosol monitor with an alarm output.

A still further object of the invention is the provision of a products of combustion, or aerosol detector, having a failure alarm which will indicate a failure or open circuit condition in the detector itself.

Other and still further objects, features and advantages of the present invention will become apparent upon a reading of the following detailed description of a preferred form of the invention taken in connection with the accompanying drawings in which.

In its most comprehensive form, the invention can be briefly described as an electronic circuit for detecting small percentage resistance changes in conductors having very high resistance, although larger changes in small absolute resistance values can also be detected. The basic circuit for achieving this end result includes a vacuum tube having a triode configuration, a means interconnected between the anode and cathode circuit of the tube responsive to a change of load current therethrough, and a conductive sensing means connected between the control grid and the negative side of a grid bias resistor in the cathode circuit which sensing means is at least in part the conductor whose change of resistance it is desired to measure. Maximum sensitivity is obtained for the detector circuit when the resistance of the sensing means is substantially equal to the grid-plate resistance of the vacuum tube.

The invention will be described first by reference to a basic equivalent circuit and then in terms of a circuit developed for use as a detector of particles of combustion employing an open ionization chamber as the sensing means and an alarm as the output. The objectives of devices of this general type is to actuate the alarm upon the detection of a predetermined density of combustion particles. The ionization chamber is of the type having two spaced electrodes defining a gas containing space therebetween and a radioactive radiation source. It has been found by the prior art to be a highly sensitive detector of aerosols or combustion particles in gases, such as air. The theory supporting the detection phenomenon is well known to the prior art but it may be briefly stated here that the ions in the chamber produced by the radiation tend to accumulate on the larger combustion particles and to recombine, thus reducing the conductivity of the chamber. With the aid of an electronic circuit to detect changes in the conductivity of the ionization chamber and an amplifying means, an alarm may be actuated.

Figure 1:
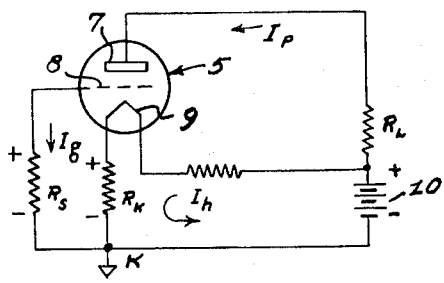
FIG. 1 is a simplified circuit diagram of the detector circuit of the present invention showing only those elements necessary for explanation of the basic theory and operation of the circuit.

FIG. 1 is illustrative of a basic circuit according to the present invention. A triode vacuum tube 5 having a plate or anode 7, a control grid 8 and a cathode or heater 9 is connected through a load, represented by the resistance $R_L$, to an appropriate source 10 of direct current power, such as a battery.

The cathode circuit is provided with a resistance $R_K$ across which is developed a bias voltage for the control grid 8. The proper biasing of the control grid 8 is an important feature of the invention inasmuch as the flow of grid current is essential to the operation of the circuit but only in an amount which is small relative to that grid current associated with full plate current conduction in the tube. It may be said here that the essence of operation of the circuit is to severely restrict plate current flow, almost to the point of tube cut-off, for normal operation but to quickly accelerate the plate current flow to maximum conduction at such time as the conductivity (or resistance) of the sensing element $R_s$ in the grid circuit changes to a predetermined value. By proper choice of a load $R_L$, such as an amplifier and switching circuit, for example, a relay contact may be made to close upon the reaching of the pre-set value of grid circuit resistance change.

In the circuit of FIG. 1, the filament or heater current $I_h$ is constant and establishes a primary bias for the control grid 8, which is negative with respect to the cathode 9 to the extent necessary to operate the tube just above cut-off. It is of course necessary to maintain some grid current $I_g$ through the sensing element $R_s$ in order to maintain a reference against which a change in the value of $R_s$ may be detected or measured. Because of the extremely high resistance of the ionization chamber, grid currents of the order of $10^{-8}$ to $10^{-14}$ amperes are customary in the circuits of this invention.

Figure 2:
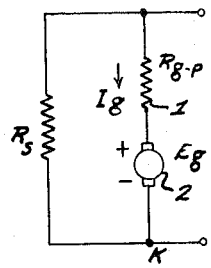
FIG. 2 is an equivalent circuit diagram of the grid circuit of the tube shown in FIG. 1.

To obtain grid current of such small magnitude it is necessary that the grid current characteristics of a given vacuum tube substantially match the current characteristics of the ionization chamber connected in the grid circuit. Another way of stating the same requirement is to say that the resistance of the sensing element $R_s$ must be substantially the same as the grid to plate resistance of the tube 5. An analysis of the simple equivalent circuit of FIG. 2 will verify the latter statement. In the circuit of FIG. 2 the vacuum tube 5 of FIG. 1 has been replaced with a generator 2 having an internal resistance 1 of Rg-p. The resistance of the sensing element $R_s$ symbolizes the grid circuit load. It is a well known principle of the electrical art that maximum power is transferred when the impedance of a load matches the impedance of the source and by application of this fundamental to the circuit of FIG. 2 it is seen that if the grid-plate resistance closely matches the resistance of the sensing means $R_s$ maximum change in voltage drop across the sensing resistance $R_s$ will be present for a given change of value of that resistance. In other words, maximum sensitivity is achieved by matching the two resistances, $R_s$ and Rg-p.

One of the objects of the present invention is to provide a tube and circuit therefor which will accomplish the required matching of an ionization chamber without using a so-called high performance or special tube. It has been found feasible to operate many standard triode vacuum tubes at substantially derated supply voltages and thereby attain the desired operating characteristics, especially with reference to the grid current. As later described in more detail, a derated type 6007 has been found well suited to the performance criteria suggested here, giving not only the low grid currents necessary but giving longer and more dependable tube life because of the low operating potentials.

The operation of the circuit may be understood by reference again to FIG. 1. At quiescent operation, the load current $I_p$ is minimum and is insufficient to actuate or operate the responsive means indicated as $R_L$. If, however, the resistance of the sensing means rises, as for example the resistance of an open ionization chamber would do in the presence of smoke, the control grid 8 is driven more positive because of the increase in voltage drop across the resistance of the sensing means $R_s$. A greater positive grid potential allows greater plate current $I_p$ to flow, consequently raising the level of grid current $I_g$ even higher. The progressive action of increasing currents soon results in full conduction in the tube 5 and actuation of the load $R_L$, which is preferably an alarm means.

Figure 3:
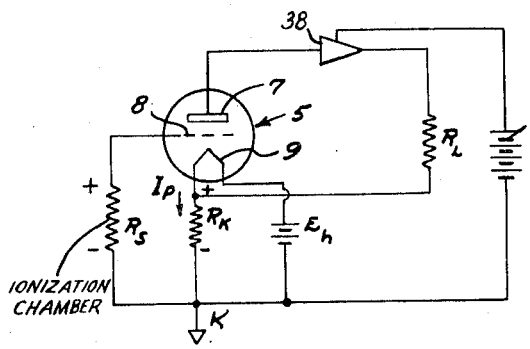
FIG. 3 is a circuit diagram of the detector of the present invention having as its primary purpose the illustration of the negative feedback stabilizing circuit.

In view of the very small currents employed in the grid circuit of the device and small changes in the resistance of the sensing means which are relied upon to actuate the switching circuits of the load $R_L$ via amplifier 38, stability of the circuit is an important factor. Instability may possibly result from normal drift of operating characteristics of the tube and associated components, fluctuating supply voltage and from conductivity changes in the ionization chamber $R_s$ due to variations in atmospheric pressure, ambient temperature and humidity. The first two of these sources of instability are effectively dealt with by an arrangement of negative feedback, the source of which is the grid bias resistor $R_k$ in the cathode circuit as shown in FIG. 3. Any random increase in plate current $I_p$ tends to produce a greater negative voltage at the point indicated as K in the circuit diagram. Because $R_s$ is great in value and the grid current $I_g$ is small, the increase in negative potential at K is felt on the control grid of the tube, thus decreasing the flow of plate current $I_p$, due to the increased negative bias.

Figure 4:
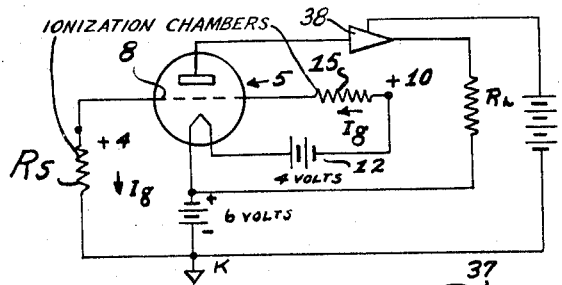
FIG. 4 is a simplified circuit diagram of the present invention having as its primary purpose the showing of the reference ionization chamber stabilization of the circuit.

FIG. 4 illustrates in a simplified circuit the preferred method of eliminating the effects of the third form of instability, that due to the fluctuations of ionization chamber characteristics.

A reference ionization chamber 15 similar in characteristic to the sensing chamber Rs but which is closed to particles of combustion is connected by one electrode to the control grid 8 of the vacuum tube 5 and by the other electrode to a source of positive voltage which may be a resistor through which a current flows or it may be simply a battery 12.

The reference chamber 15 is operated in a non-saturated condition so as to permit a change of current therethrough with a change in voltage across the chamber, that is the point of operation is along the steep slope portion of the voltage-current curve rather than at a point along the flat portion of said curve.

By examining the grid current loop thus formed and by taking exemplary figures for the voltage drops around the path it is apparent that in the example the grid is 2 volts negative with respect to the cathode, there being a 6 volt drop across the reference chamber 15 and a 4 volt drop across the sensing chamber Rs. Any atmospheric or other environmental change which would effect the resistance of the sensing chamber Rs will proportionately effect the reference chamber 15 and the voltage on the control grid 8 will remain constant, thus avoiding alarm responses from non-alarm conditions.

Figure 5:
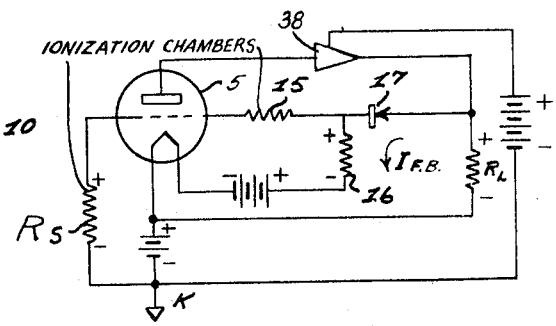
FIG. 5 is a simplified circuit diagram of the present invention illustrating the positive feedback circuit features of the invention.

The stability circuit provided by the reference chamber 15 is also useful as a portion of a positive feedback loop to further accelerate full conduction of the tube 5 under so-called alarm conditions. In FIG. 5 a resistor 16 and silicon diode 17 are shown added to the circuit of FIG. 4 as a clamping or conduction level circuit. As plate current $I_p$ increases due to increased resistance of the sensing chamber Rs the voltage drop across the load resistance $R_L$ will increase, causing the potential of the back side of the diode 17 to approach the potential of the forward side, which, for sake of example, has been denominated as 10 volts. When the back side voltage exceeds the 10 volts, the diode 17 will conduct, allowing a feedback current $I_{F.B.}$ to suddenly flow through the positive feedback resistor 16, establishing a sudden positive potential on the control grid 8 sufficient to bring the tube into full conduction for reliable actuation of the switching circuits represented by the load resistor $R_L$.

Figure 6:
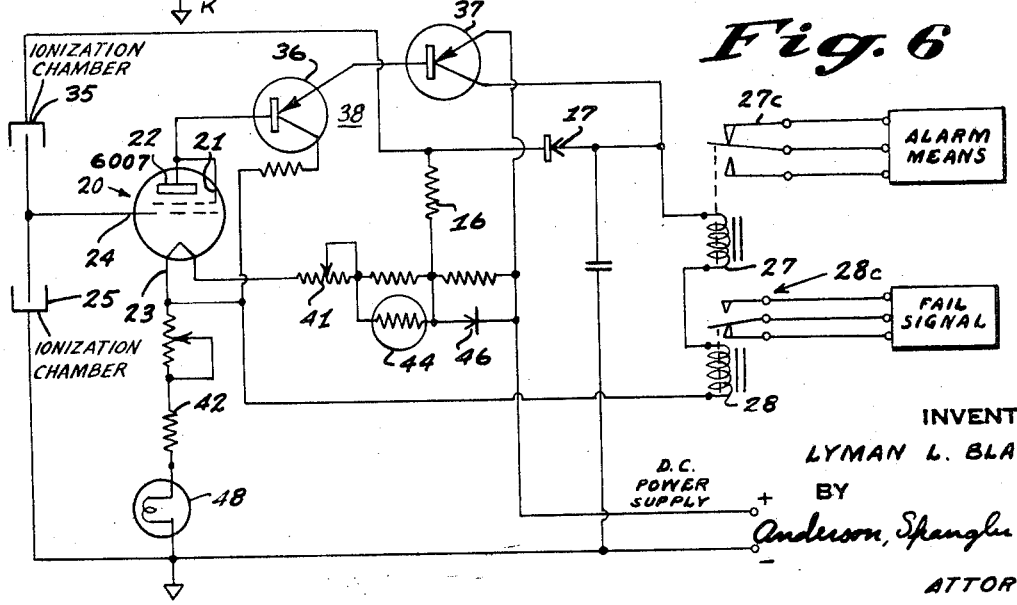
FIG. 6 is a complete schematic circuit diagram of a preferred form of a detector unit of the present invention showing the alarm means and failure signal device in block diagrams.

Having described the various basic features of the invention, reference is made to FIG. 6 where a schematic diagram of a preferred practical embodiment of the inventive circuit is shown.

As briefly mentioned earlier, the vacuum tube 20 is a type 6007 which is converted from a tetrode to triode by tieing the screen grid 21 to the plate 22. By applying 20 volts to the plate 22 and derating the filament voltage, grid current on the order of $10^{-14}$ amperes can be maintained through a grid circuit ionization chamber 25 having a radium sulfate radiation source of 0.9 mil. curie. In series with the plate circuit are two amplifying PNP transistors 36 and 37 forming an amplifier 38 whose output is connected to the series connected coils 27 and 28 of a pair of relays having electromagnetically actuated contacts 27c and 28c. The return side of the second relay coil 28 is connected to the filament 23 of the vacuum tube 20. The second relay 28 with its contacts 28c may be referred to as a trouble or fail relay inasmuch as the quiescent load current $I_L$ is sufficient to keep the relay coil energized to the extent necessary to pick up the contacts 28c. Failure of the detector device terminates the quiescent current and causes the fail relay coil 28 to become de-energized, thus actuating the fail signal through the normally open contacts 28c. Full conduction of the vacuum tube 20 causes both transistors to become fully conductive and sufficient current is supplied to the alarm relay coil 27 to actuate the contacts 27c and complete the circuit in a separate alarm means which may be one of a number of well known visual or audible devices.

The reference ionization chamber 35, similar to the sensing chamber except that it is closed to smoke or other particles of combustion, is shown connected to the grid 24 of the vacuum tube 20 and to the positive feedback components, the silicone diode 17 and positive feedback resistor 16. In the diagram of FIG. 6, the filament supply dropping resistor 41 and the series combination of cathode resistors 42 may be equated to the simple batteries in FIGS. 4 and 5. The termistor 44 and zener diode 46 have as their purpose the further regulation of supply voltage.

Lamp 48, shown in the cathode circuit of the tube 20, serves as an indicator of circuit operating condition, and also serves as a current sensitive resistance to aid in the circuit re-set operation. The characteristic of a lamp filament to increase resistance with increasing current is utilized to produce a large negative bias to the grid when the condition causing the alarm has disappeared. Once the high negative bias has succeeded in cutting the tube off the lamp is extinguished and the high lamp resistance is reduced to normal, allowing the resumption of quiescent operation.

Having thus described the several useful and novel features of the Detector Circuit of the present invention in connection with the accompanying drawings, it will be seen that the many worthwhile objectives for which it was designed have been achieved. Although but a few of the several possible embodiments of the invention have been illustrated and described herein, I realize that certain additional modifications may well occur to those skilled in the art within the broad teaching hereof; hence, it is my intention that the scope of projection afforded hereby shall be limited only insofar as said limitations are expressly set forth in the appended claims.

I claim:

1. An electronic circuit for detecting small percentage resistance changes in devices having high resistance, including: an electron vacuum tube having a cathode, anode and control grid; means responsive to a change of electrical current interconnected between the anode and cathode of said vacuum tube as a load thereon; a grid bias resistor having one terminal thereof connected to the cathode wherein the cathode is biased positive with respect to the grid; a source of direct current electrical power having positive and negative polarity terminals, said negative terminal connected to the other terminal of the bias resistor; means interconnecting said vacuum tube anode and the positive polarity terminal of said source; and, conductive means interconnected between the said control grid and the said other terminal of the grid bias resistor, the electrical resistance of said conductive means being substantially equal to the effective internal plate resistance of the vacuum tube, said resistance of the conductive means being of a value which permits some significant amount of grid current to flow at all times, said means responsive to a change of electrical current includes electrically actuated switch means having a pair of terminals and positive feedback means interconnected between the control grid of the vacuum tube and that terminal of the switch means connected to the power supply which is most positive with respect to the cathode of the vacuum tube to drive the grid more positive producing positive feedback upon anode-cathode current increase.

2. Apparatus responsive to change in resistance of a high resistance device, including: a vacuum tube having a cathode, control grid and anode, voltage means normally biasing the control grid almost to the point necessary for tube current cut-off to permit some significant amount of grid current to flow at all times; load means connected to the anode of said tube and including switching means responsive to a given level of load current; negative feedback means including a current path between said load and said voltage biasing means; and voltage supply means connected to said tube cathode, control grid and anode having a magnitude appropriate to cause the tube input resistance to substantially equal the resistance of the high resistance device while permitting some significant amount of grid current to flow at all times, said high resistance device includes an ionization chamber having electrodes exposed to air and further including: a positive feedback means; a voltage source, a reference ionization chamber closed to exposure from the air, and having one electrode connected to the control grid of the tube and a second electrode connected to positive feedback means and a voltage source.

3. The combination of claim 2 wherein the switching means includes a first alarm relay coil and a second alarm relay coil, said second relay coil being sized and designed to actuate relay contacts when carrying the said tube current just above tube cut-off.

* * * * *